(12) United States Patent
Watts et al.

(10) Patent No.: US 8,578,089 B2
(45) Date of Patent: Nov. 5, 2013

(54) STORAGE DEVICE CACHE

(75) Inventors: Ron Watts, Redmond, WA (US); Jack Lakey, Longmont, CO (US)

(73) Assignee: Seagate Technology LLC, Cupertino, CA (US)

( * ) Notice: Subject to any disclaimer, the term of this patent is extended or adjusted under 35 U.S.C. 154(b) by 286 days.

(21) Appl. No.: 12/916,109

(22) Filed: Oct. 29, 2010
(Under 37 CFR 1.47)

(65) Prior Publication Data

US 2012/0110258 A1   May 3, 2012

(51) Int. Cl.
- *G06F 12/00* (2006.01)
- *G06F 13/00* (2006.01)
- *G06F 13/28* (2006.01)

(52) U.S. Cl.
USPC ............ 711/113; 711/138; 711/154

(58) Field of Classification Search
USPC ............ 711/111, 118, 138, 154
See application file for complete search history.

(56) References Cited

U.S. PATENT DOCUMENTS

| | | | |
|---|---|---|---|
| 6,178,481 B1 * | 1/2001 | Krueger et al. | 711/122 |
| 2006/0020634 A1 * | 1/2006 | Huras et al. | 707/200 |
| 2006/0085598 A1 * | 4/2006 | Nemoto et al. | 711/118 |
| 2006/0136765 A1 * | 6/2006 | Poisner et al. | 713/323 |
| 2006/0168400 A1 * | 7/2006 | Ronciak et al. | 711/118 |
| 2008/0260190 A1 * | 10/2008 | Kidmose | 381/314 |
| 2009/0049247 A1 * | 2/2009 | Henshaw et al. | 711/118 |
| 2010/0185811 A1 * | 7/2010 | Kwon | 711/105 |
| 2011/0138106 A1 * | 6/2011 | Prabhakaran et al. | 711/103 |

* cited by examiner

*Primary Examiner* — Ryan Bertram
(74) *Attorney, Agent, or Firm* — HolzerIPLaw, PC

(57) ABSTRACT

Implementations described and claimed herein provide a method and system for comparing a storage location related to a new write command on a storage device with storage locations of a predetermined number of write commands stored in a first table to determine frequency of write commands to the storage location. If the frequency is determined to be higher than a first threshold, the data related to the write command is stored in a write cache.

19 Claims, 7 Drawing Sheets

FIG. 2

| Index | Sequence | Start | Time Between Cmds (seconds) | Minutes since start of capture | Command | Start LBA | Transfer Length | End LBA | blocks | time since last write to this log (17M) | time since last write to this log (168M) |
|---|---|---|---|---|---|---|---|---|---|---|---|
| 0 | 11 | 0.195566 | 0 | 0.003259 | <Write DMA Extended> | 124,461,347 | 65,536 | 124,461,475 | 128 | | |
| 1 | 25 | 0.454491 | 0.258925 | 0.007575 | <Write DMA Extended> | 17,327,619 | 3,072 | 17,327,625 | 6 | 1.00001861 | |
| 2 | 39 | 0.758548 | 0.304057 | 0.012642 | <Write DMA Extended> | 124,461,475 | 65,536 | 124,461,603 | 128 | | |
| 3 | 53 | 1.454451 | 0.695961 | 0.024242 | <Write DMA Extended> | 17,327,619 | 4,608 | 17,327,628 | 9 | | |
| 4 | 67 | 1.510168 | 0.055658 | 0.025169 | <Write DMA Extended> | 2,054,767 | 4,096 | 2,054,775 | 8 | | |
| 5 | 81 | 1.510323 | 0.000155 | 0.025172 | <Write DMA Extended> | 2,048,495 | 4,096 | 2,048,503 | 8 | | |
| 6 | 95 | 1.510484 | 0.000161 | 0.025175 | <Write DMA Extended> | 2,048,479 | 4,096 | 2,048,487 | 8 | | |
| 7 | 109 | 1.510708 | 0.000224 | 0.025178 | <Write DMA Extended> | 168,282,011 | 8,192 | 168,282,027 | 16 | | |
| 10 | 151 | 1.681537 | 0.169547 | 0.028026 | <Write DMA Extended> | 124,461,603 | 65,536 | 124,461,731 | 128 | | |
| 11 | 165 | 2.454479 | 0.772942 | 0.040908 | <Write DMA Extended> | 17,327,627 | 2,048 | 17,327,631 | 4 | 0.99996904 | |
| 12 | 179 | 2.743487 | 0.289008 | 0.045725 | <Write DMA Extended> | 124,461,731 | 65,536 | 124,461,859 | 128 | | |
| 13 | 193 | 3.454459 | 0.710972 | 0.057574 | <Write DMA Extended> | 17,327,627 | 3,584 | 17,327,634 | 7 | 0.99998053 | |
| 14 | 207 | 3.809434 | 0.354974 | 0.063491 | <Write DMA Extended> | 124,461,859 | 65,536 | 124,461,987 | 128 | | |
| 15 | 221 | 4.454447 | 0.645014 | 0.074241 | <Write DMA Extended> | 17,327,627 | 5,120 | 17,327,637 | 10 | 0.99998803 | |
| 16 | 235 | 4.466988 | 0.012541 | 0.07445 | <Write DMA Extended> | 124,461,987 | 65,536 | 124,462,115 | 128 | | |
| 17 | 249 | 5.215571 | 0.748583 | 0.086926 | <Write DMA Extended> | 124,462,115 | 65,536 | 124,462,243 | 128 | | |
| 18 | 263 | 5.454443 | 0.238872 | 0.090907 | <Write DMA Extended> | 17,327,635 | 2,560 | 17,327,640 | 5 | 0.99999574 | |
| 19 | 277 | 6.283121 | 0.828678 | 0.104719 | <Write DMA Extended> | 124,462,243 | 65,536 | 124,462,371 | 128 | | |
| 20 | 291 | 6.454416 | 0.171295 | 0.107574 | <Write DMA Extended> | 17,327,635 | 4,096 | 17,327,643 | 8 | 0.99997308 | |
| 21 | 305 | 6.512097 | 0.057681 | 0.108535 | <Write DMA Extended> | 2,054,775 | 4,096 | 2,054,783 | 8 | | |
| 22 | 319 | 6.512256 | 0.000158 | 0.108538 | <Write DMA Extended> | 2,048,503 | 4,096 | 2,048,511 | 8 | | |
| 23 | 333 | 6.512437 | 0.000181 | 0.108541 | <Write DMA Extended> | 2,048,479 | 4,096 | 2,048,495 | 8 | | |
| 24 | 347 | 6.512673 | 0.000236 | 0.108545 | <Write DMA Extended> | 168,282,027 | 8,192 | 168,282,043 | 16 | | 5.00161832 |

STORAGE DEVICE CACHE

BACKGROUND

Storage devices, such as disc drives, that experience heavy workloads are prone to failure by virtue of the number of requests that the storage devices process. These heavy workloads significantly reduce drive life and field reliability, and result in increased costs for warranty services.

SUMMARY

Implementations described and claimed herein provide a method and system for comparing a storage location related to a new write command on a storage device with storage locations of a predetermined number of write commands stored in a first table to determine frequency of write commands to the storage location. If the frequency is determined to be higher than a first threshold, the data related to the write command is stored in a write cache.

These and various other features and advantages will be apparent from a reading of the following detailed description.

BRIEF DESCRIPTIONS OF THE DRAWINGS

FIG. 2 illustrates an example workload of a storage device used for security cameras.

DETAILED DESCRIPTIONS

Figure 1:
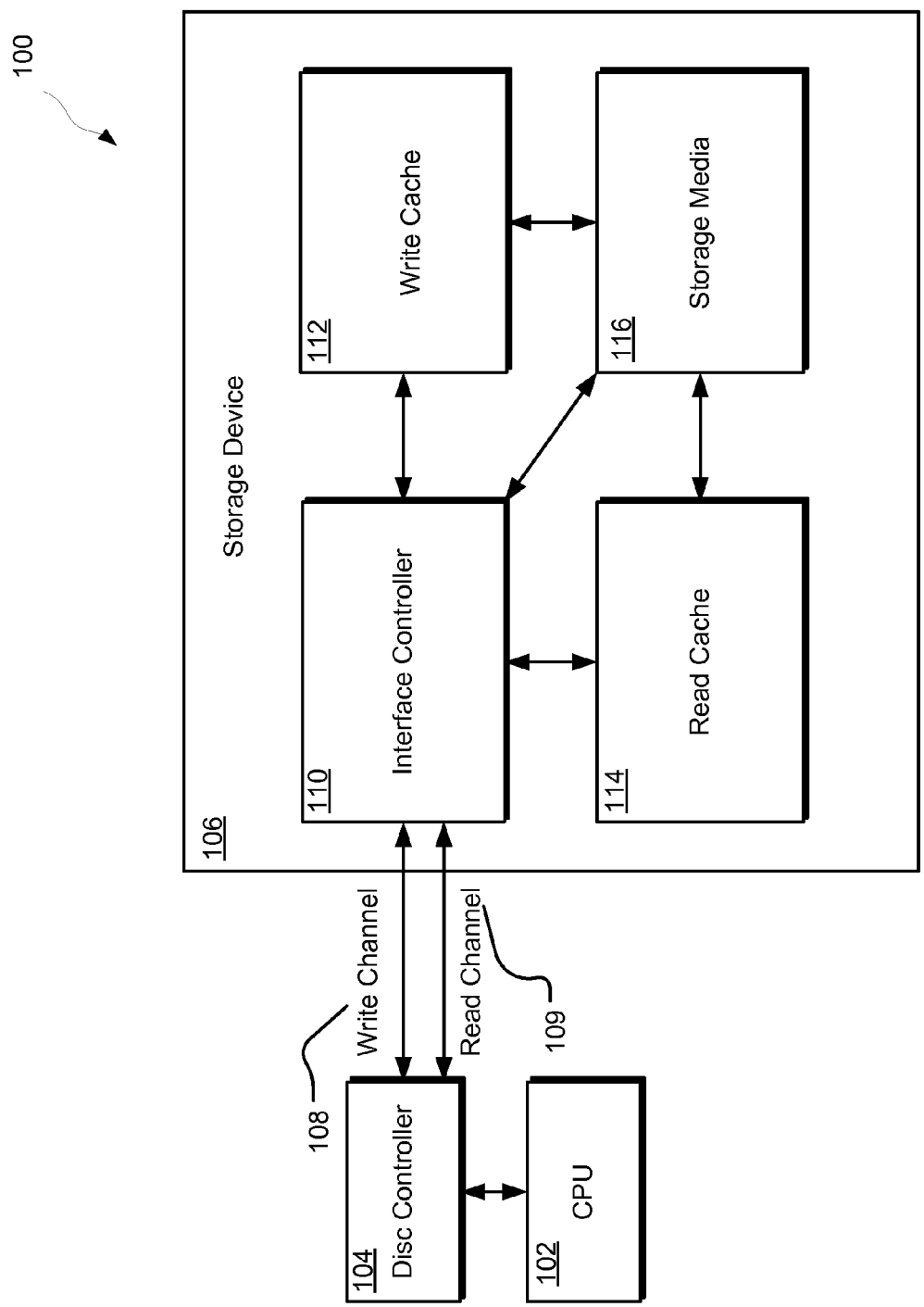
FIG. 1 illustrates an example of a computing system incorporating a storage device having a cache.

Storage devices disclosed herein, such as hard disk drives (HDD) and solid-state drives (SSD), exist in computing devices, such as a computer, in order to store information such as the operating system used by the computing device, software applications and their data, emails, media, amongst other data. Information is constantly read from and written to a storage device. When a storage device receives a data packet and a request to write information to the storage medium, the storage device determines where the information is to be physically stored on the medium. In the case of a hard disc drive, when the storage device determines a suitable location to store the data, a read/write transducer is moved, by an actuator, to the physical location on the storage medium where the information will be written. The time required 1) to determine a location to store the information and 2) move the transducer to the desired location (e.g., seek time) may take up to 10 milliseconds (ms). Computer performance will be substantially affected if the computer has to wait up to 10 ms for each write request that occurs during normal computing. Additionally, when the computer requests to receive existing information from the storage device, through a read request, a comparable amount of time is spent moving the read/write transducer to the physical location where the requested data is stored.

Accordingly, storage devices disclosed herein are equipped with read and write caches to address the problem of reduced performance during a seek or a during a read/write operation. In one implementation, a cache or a buffer is a temporary storage medium, embedded into the storage device, where data can be temporarily stored. In the case of a write cache, data may be temporarily stored in the write cache before being written to the storage medium. In the case of a read cache, frequently accessed data may be stored in the read cache as a means of reducing the time for accessing this data without accessing the storage medium. In one implementation, a cache is comprised of random access memory (RAM) such as direct random access memory (DRAM), or static random access memory (SRAM).

Reading data from and writing data to RAM are significantly faster than reading data from and writing to a traditional platter-based hard disc drive. However, RAM is a volatile memory, which means that the memory needs a constant power source to maintain the data stored therein. In other words, once the computer is turned off, or if it loses power, the storage device's read and write caches are erased. Additionally, RAM may be cost-prohibitive as a storage solution for storage drives, as the cost per gigabyte of RAM is significantly higher than the equivalent cost for hard disc drives, which have eclipsed two terabytes in size. In one implementation, the total size of a storage device cache is between 16 and 32 megabytes (MB) with sizes as high as 128 MB. In one implementation, the write cache and the read cache is equally split the total size of the cache. However, the delineation between the read and write cache may be dynamically altered.

When a storage device utilizes a write cache, data from a write request may be written to the write cache before being persistently written to the storage medium. Writing data to the write cache does not have the same delays as writing data to the hard disk. Once data has been written to the write cache, the computer connected to the storage device does not need to wait for the data to be persistently written to the storage medium. In one implementation, the computer is unaware that the data still resides in the write cache, and has not yet been persistently written to the storage medium. At a later time, the data can be moved from the write cache (e.g., flushed from the cache) to the storage device's non-volatile storage medium, without degrading performance of the computer. The write cache can be erased once the data is written to the non-volatile storage medium.

Reading to and writing from a cache also results in a reduction in the power used to retrieve the data. In other words, the amount of electrical power used to access the read and write cache is generally less than the amount of electrical power used to read or write data to/from the hard disc. As such, from a power utilization perspective, it is beneficial to utilize both the read and write cache as much as possible before accessing the storage medium.

FIG. 1 illustrates an example of a computing system 100 incorporating a storage device having a cache. An implementation of the computing system 100 comprises a CPU 102, a disc controller 104, and a storage device 106. The CPU 102 communicates with the storage device 106 in order to write to and access data stored in the storage device 106. The CPU 102 communicates with the storage device 106 through one or more write channels 108 and read channels 109 connected to an interface controller 110 of the storage device 106. In one implementation, the write channels 108 couple to the CPU 102 through the disk controller 104. Differing architectures may exist for permitting the CPU 102 to communicate with the storage device 106.

The storage device 106 comprises of at least an interface controller 110, a write cache 112, a read cache 114, and a storage medium 116. In one implementation, the interface controller 110 is responsible for communicating read/write requests to and from the CPU 102 and to the storage device 106. In one implementation, when a write request is sent from the CPU 102 to the storage device 106, the interface controller 110 intercepts the data from the write request and places it in the write cache 112. As previously stated, the write cache 112 temporarily holds data to be written to the storage medium 116 as a means of increasing performance of the computer and to reduce power requirements of the storage device. In other words, since the data can be written to the write cache 112 much faster than the storage medium 116, the CPU 102 does not need to wait for the data to be persistently written to the storage medium 116 before proceeding to other operations. As stated above, the time spent determining a write location on a storage medium, as well as the time spent moving a read/write actuator (e.g., seek time) to the desire location, can be lengthy. If the CPU 102 waits for these steps to occur before proceeding to other operations, performance of the CPU 102 decreases considerably. Additionally, the amount of electrical power used to write data to the write cache 112 is less than that of writing data to the storage medium 116. In one implementation, the data stored in the write cache 112 is flushed from the write cache 112 once the write cache 112 is full. In one implementation, flushing of the write cache means that the data stored in the write cache 112 is copied to the storage medium 116 and then removed from the write cache 112.

One implementation for reducing power requirements is to utilize the read and write caches of the storage device 106 as often as possible. In the case of a write request, the interface controller 110 may purposely delay moving data from the write cache 112 to the storage medium 116 until the write cache 112 is full. As such, data remains in the write cache for as long as possible. In the case of a read request, the interface controller 110 accesses the data from the read cache 114, assuming the requested data exists in the read cache. Delaying reading from and writing to the storage medium 116, until necessary, results in reduced power consumption.

In one implementation, the disk controller 246 orders the execution of one or more write commands from the queue 240 such that one or more parameters, such as the average seek time, total seek time, etc., is optimized. Workload captures indicate that some logical block addresses (LBAs) experience significantly more workload activity than other LBAs. For example, a hard disc drive based MPEG-1 Audio Layer 3 (MP3) player may receive a single sector write command directed at the same LBA in excess of ten times per minute. Assuming a user uses this MP3 player approximately thirty hours per week over a five-year period, that LBA would experience roughly 4,800,000 writes during that time. Similarly, a WEB server application may write to the same LBA 8,761 times per day. Over a five-year period, that LBA experiences more than 79 million writes. Workload captures indicate that these types of repeated writes to the same LBAs are the writings of log files.

Much of the workload of storage devices is the result of repetitively writing small blocks of data, such as, for example, system logging data. System logging results in the repeated writing of small blocks to the same location, with a predictable time interval. In some cases, system logging can represent more than 50% of the write commands to a storage device, as logs are written as frequently as at each five second or even multiple times per second.

FIG. 2 illustrates an example workload of a storage device used for security cameras over a contiguous period of time. Specifically, FIG. 2 illustrates example command stream 200 of a digital video recorder (DVR) used for security cameras. Referring to the command stream 200, commands 1, 3, 11, 13, 15, 18, and 20 (together referred to as repeatable commands 202) each write to a logical block address (LBA) 17,327,619 a number of times. Moreover, each of the repeatable commands 202 is for writing small amount of data, ranging from 4-10 blocks, to the storage media. The commands to write the actual video data are, for example, commands 0, 2, 10, 12, 14, 16, and 17. Each of these commands to write the actual data writes a much larger block of data to the storage media, in this example, each write command being for 128 blocks.

As illustrated by the command stream 200, it is possible to identify the number of repeatable commands 202 repeatedly writing small amounts of data to a same or similar location on the storage media. While the command stream 200 of FIG. 2 is generated from a digital video recorder (DVR) used for security cameras, similar command streams for other devices using storage media are also shown to have repeatable commands similar to the repeatable commands 202 disclosed herein. Because each command of the repeatable commands 202 would require seek time and latency time similar to any other command, including a command to write the actual video data, such repeatable commands 202 would significantly affect the performance of the storage media 116. In the least, such repeatable commands 202 will result in slower performance of the storage media 116 and potentially higher power consumption.

The repeatable commands 202 may represent, for example, the logging commands, or commands to store logging data, to the storage media 116. Logging data to a storage medium is a technique used to enhance a computer system's reliability. In an implementation of logging for transactions related to storage media, each transaction generates an individual logging entry. In an alternate implementation of logging, changes introduced by a transaction related to storage media are combined into a single record and appended to a sequential log. In some implementations, such log information is accessed during a restart after a crash. Otherwise, such log information can be later discarded. Thus, for example, for the DVR system discussed above, logging data may be related to each individual write, access, etc., for the actual video data stored on storage media.

Figure 3:
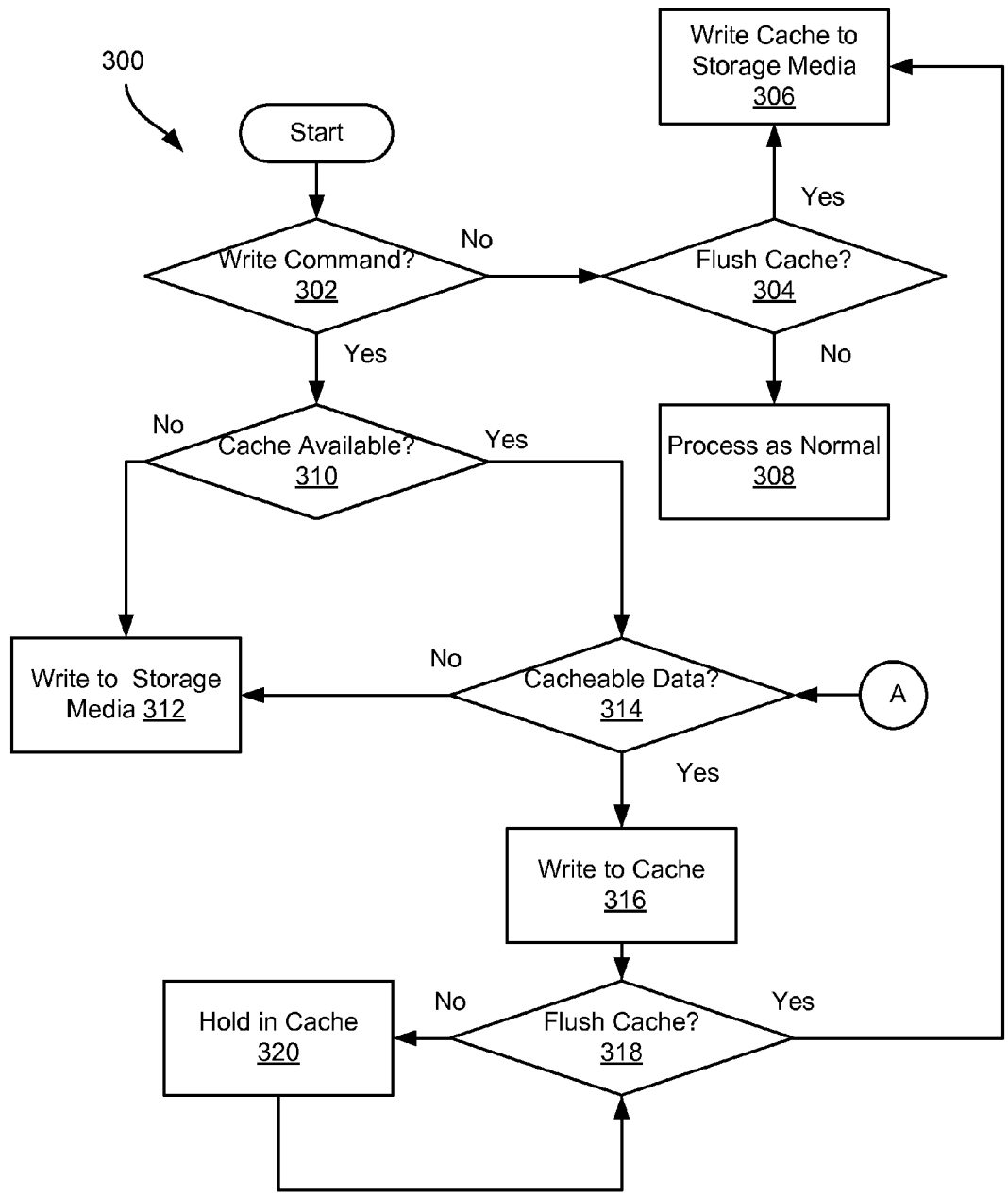
FIG. 3 illustrates example operations for reducing the execution of write commands to enhance the reliability of a storage device.

FIG. 3 illustrates an example program 300 with operations for reducing the execution of write commands to enhance the reliability of a storage device. An implementation of the program 300 allows the interface controller 110 to analyze a command received from the disc controller 104 and the related content. Specifically, the program 300 determines whether the command relates to writing data that is repeatedly written to specific storage locations on the storage media 116. In one implementation, the program 300 is implemented at any of the interface controller 110, the disc controller 104 or at some other locations communicatively connected to the storage device 106.

Upon receiving a command, such as a command from the disc controller 103, a determination operation 302 determines if the received command is a write command. Generally, such a determination is made by analyzing the header of the received command, the command type, etc. If it is determined that the received command is not a write command, control passes to a determination operation 304, which determines whether there is any need to transfer the data from the write cache 112 to the storage media 116, also known as flushing the write cache 112. The operation 304 determines that the write cache 112 needs to be flushed based on a number of criteria, including whether the received command indicates any kind of power interrupt signal. Alternatively, the operation 304 also decides to flush the write cache 112 in response to a signal that indicates expiration of a timer, etc. For example, in one implementation, a timer is set so that it iteratively expires at pre-determined intervals, for example, at one-minute intervals, at five-minute intervals, etc.

In one implementation, upon expiration of the timer, a command is sent to the interface controller 112, wherein such a command causes the operation 304 to determine that the write cache needs to be flushed. In an alternate implementation, the interface controller 112 generates such a timer command. Moreover, in an alternate implementation, the operation 304 also determines that the read cache 114 also needs to be flushed. Subsequently, the operation 304 send a signal to the operation 306, which writes the data from the write cache 112 to the storage media 116. Based on the command received from operation 304, operation 306 also writes the data from the read cache 114 to the storage media 116. If the determination operation 304 determines that there is no need to flush any cache, transfer is passed to a block 308, and accordingly, the storage device functions as normal.

If the determination operation 302 determines that the received command is a write command, control is passed to a determination operation 310. The determination operation 310 determines whether any cache is available for storage of the data related to the write command. Specifically, the determination operation 310 determines if there is any space available in the write cache 112. In one implementation, the write cache 112 is full if the amount of data stored in the write cache 112 is substantially equal to the total size of the write cache 112. Additionally, in one implementation the write cache 112 is deemed full if the amount of data stored in the write cache 112 and the amount of data from the received write command would exceed the total size of the write cache 112.

If the write cache 112 is full, control passes to a writing operation 312, which writes the data related to the received write command to the storage media 116. However, if the determination operation 310 determines that the write cache 112 is not full, the control passes to a determination operation 314. The determination operation 314 analyzes the data attached to the write command to determine if the data is cacheable, or that the data should be cached. Such determination may require one or more of parsing the data, comparing one or more parts of the data to predetermined information, collecting a number of statistics related to cumulative commands, etc. The process of determining whether the data attached to a write command is cacheable or not is described in further detail in FIGS. 4-7 below.

If the determination operation 314 determines that the data is not cacheable, control is again transferred to the writing operation 312, which writes the data to the storage media 116. However, if the determination operation 314 determines that the data is cacheable, control is passed to a writing operation 316. The control operation 316 writes the data to the write cache 112. Note that generally cache is based on a volatile memory such as a random access memory (RAM) (including direct random access memory (DRAM) or static random access memory (SRAM)). As such, anytime there is a power interruption or outage, there is a possibility that the data stored in the cache is lost permanently.

To prevent such permanent loss of data from happening, the program 300 provides for periodic and event based transferring of the data (flushing the cached) stored in the write cache 112 to the storage media 116. As such, upon writing the data to the cache at the writing operation 316, control is passed on to a determination block 318. The functioning of the determination block 318 is generally similar to the operation of the determination block 304. As such, in some implementations both operations 304 and 318 are implemented by a single program or subroutine called from multiple points of the program 300.

If the determination block 318 determines that the data from the write cache 112 does not need to be transferred to the storage media 116, the data is held in the write cache 112, as suggested by the operation 320. However, if for any reason transfer of data from the write cache 112 is warranted, control is transferred to the transfer operation 306.

While the various operations of the program 300 are shown as being performed sequentially, in practice, many of these operations may be performed in parallel. For example, while the program 300 illustrates that the determination operations 304 and 318 to transfer data from the write cache 112 are triggered in response to completion of their preceding operations, in alternate implementations, such determination operations to transfer data from the write cache 112 may continuously run in parallel to the rest of the operations.

Figure 4:
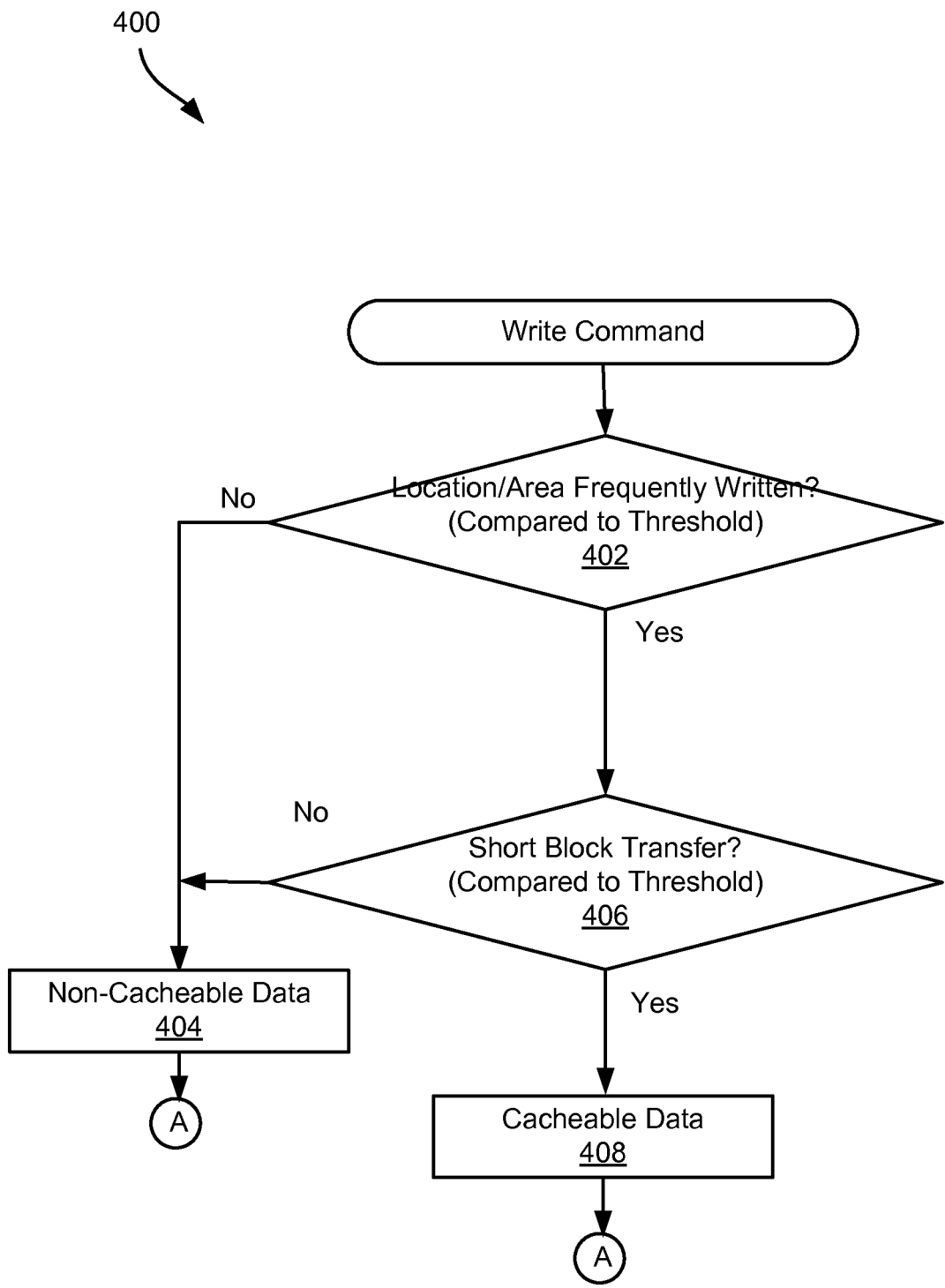
FIG. 4 illustrates example operations for determining whether a write command should be written to cache or to non-cache storage media.

FIG. 4 illustrates example operations for determining whether data related to a write command should be held in cache or written to disk. Specifically, FIG. 4 illustrates a program 400 that determines whether the data attached to a received write command is cacheable. In one implementation, the program 400 is part of the determination operation 314 disclosed in FIG. 3. Alternately, the determination operation 314 may call a subroutine that implements various operations of the program 400. Thus, upon the initiation of the program 400, it is generally determined that the received command is a write command. A determination block 402 compares the target storage location where data related to the write command is to be stored on the storage media 116 with such storage locations of past commands. The determination block 402 also monitors the frequency of such writings to the target storage locations in the recent past. For example, in one implementation, the determination block 402 monitors the frequency of such data written to the target storage locations in last 20 write commands. Alternatively, frequency over last certain time-period can also be monitored.

In yet alternate implementation, the storage locations for which the frequency of write commands are monitored may be slightly different from the target storage locations based on the write command that is being evaluated. Thus, for example, if the current write command provides a target location of LBA 00145 to LBA 00150, the determination block 402 monitors frequency of recent write commands to locations at LBA 00140 to LBA 00155. If the determination block 402 determines that the frequency of writing operations to the target location, and surrounding locations, is below a predetermined threshold frequency, the control is transferred to an operation 404. In such a case, the determination operation 402 is in effect determining that the data related to the write operation at hand is not frequently written data and as such, it is probably not cacheable data. Such a rule may be based on the observation that cacheable data, such as logging data, etc., is usually written again and again to the same location on the storage media 116. Subsequently the operation 404 marks the data attached to the write operation as non-cacheable data and control passes to the operation 314 of FIG. 3.

If the determination operation 402 determines that the frequency of writing operations to the target location, and surrounding locations, is at or above a predetermined threshold frequency, the control is transferred to a determination operation 406. The determination operation 406 evaluates the size of the block of data to be written as per the write command. The determination block 406 also monitors the size of the data blocks written to the target locations over a certain past period and uses that data to determine the threshold size to which the current data block is compared. If the determination block 406 determines that the size of the data block to be written as per the write command is above a threshold, control is transferred to the block 404, which marks the data related to the write command as non-cacheable data. However, if the determination block 406 determines that block size of the data to be written to be smaller than certain threshold, then the control is transferred to a block 408, which marks the data attached to the write command as cacheable data.

While as described in the program 400 above, the determination of frequency comparison and the block-size comparison are done at separate operations 402 and 406, in an alternate implementation, such determinations are made contemporaneously. In yet alternate implementation, the frequency threshold is dependent on the block size threshold and vice versa. Thus, for example, for smaller block sizes, the frequency threshold may be lower, but for higher block sizes, the frequency threshold may be higher, etc.

Figure 5:
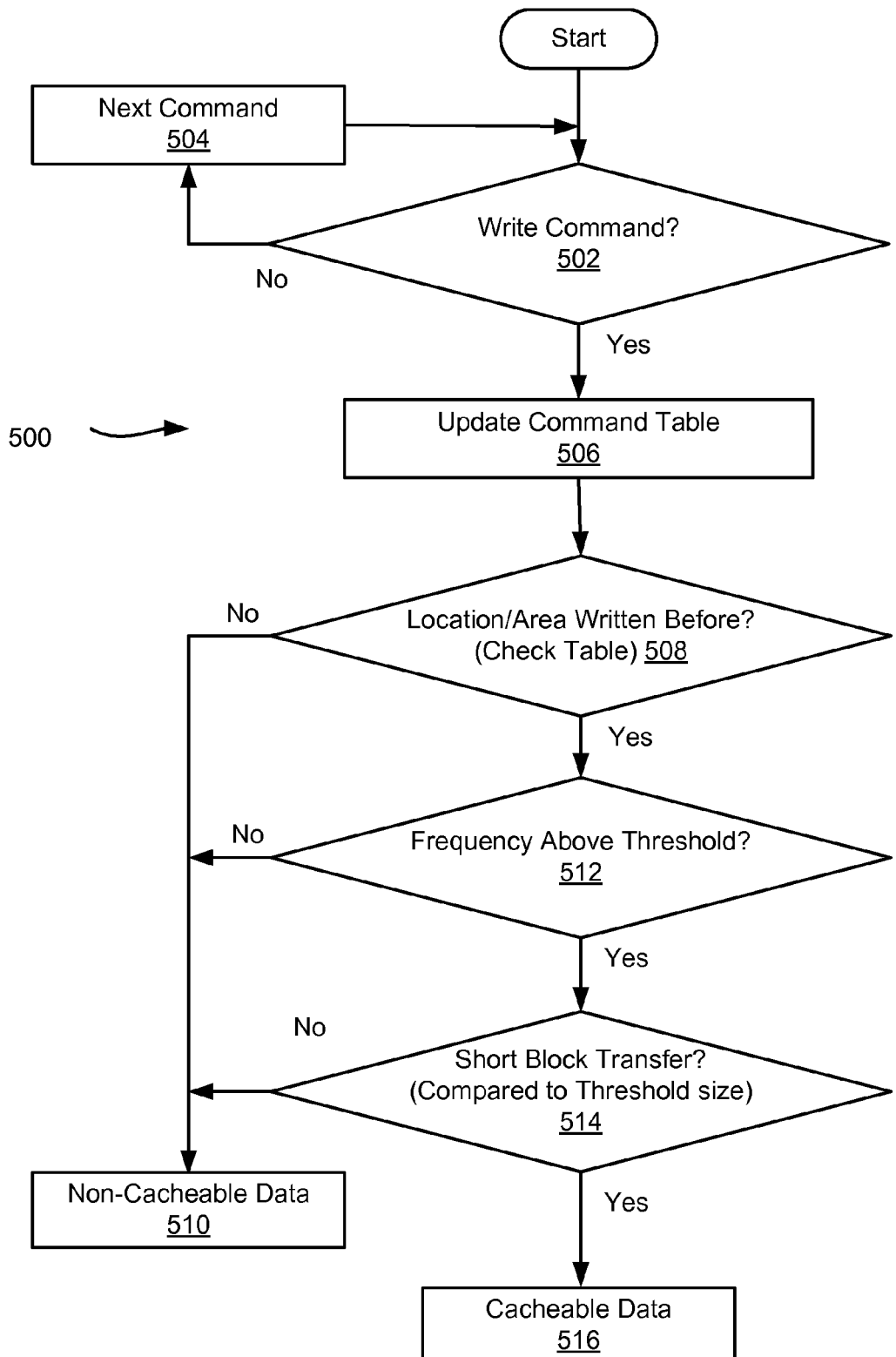
FIG. 5 illustrates alternate example operations for determining whether a write command should be written to cache or to non-cache storage media.

FIG. 5 illustrates alternate example operations for determining whether a write command should be held in cache or written to disk. Specifically, FIG. 5 illustrates a program 500 that allows determining whether data attached to a command received at the interface controller 110 is cacheable data or not. A determination operation 502 continuously monitors commands received at the interface controller 110. If the determination operation 502 determines that a command is not at write command, it loops back via operation 504 to monitor the next command. If the determination operation 502 determines that a received command is a write command, control is transferred to operation 506, which updates a command table. The command table maintained by the operation 506 keeps information about certain number recently received commands in the command table.

Thus, for example, in one implementation, the command table has information about the size of each block of data written pursuant to recent write commands. In an alternate implementation, the command table also includes data related to the storage locations on the storage media 116 for each block of data written pursuant to recent write commands. Subsequently, a determination operation 508 compares that storage location/area where the block of data is to be written on the storage media 116 with the list of previously written storage locations as provided in the command table. Thus, as disclosed above with respect to operation 402, if the determination operation 508 determines that the storage location/area is not written before, it may pass control to an operation 510 that marks the data attached to the write operation as non-cacheable data.

However, if the determination operation 508 determines that the location or area where the block of data from the current write command is to be written has been written before, it transfers control to a determination operation 512. The determination operation 512 determines whether the observed frequency of such earlier writes to the storage location, based on the commands stored in the command table, is above a predetermined threshold frequency. If the observed frequency is below the predetermined threshold frequency, control is transferred to the operation 510. However, in cases where the observed frequency is above the threshold frequency, control is transferred to a determination operation 514.

The determination operation determines if the block-size of the data to be written pursuant to the current write command is above a threshold size. As discussed above with respect to operation 406, if it is determined that the block-size of the data is above the threshold, probably the block does not represent a cacheable data. Therefore, control is transferred to the operation 510. However, if the operation 514 determines that the block-size of the data is below the threshold, it is likely that the block of data represents a cacheable block of data and as such, control is transferred to an operation 516 that marks the block of data as cacheable.

Figure 6:
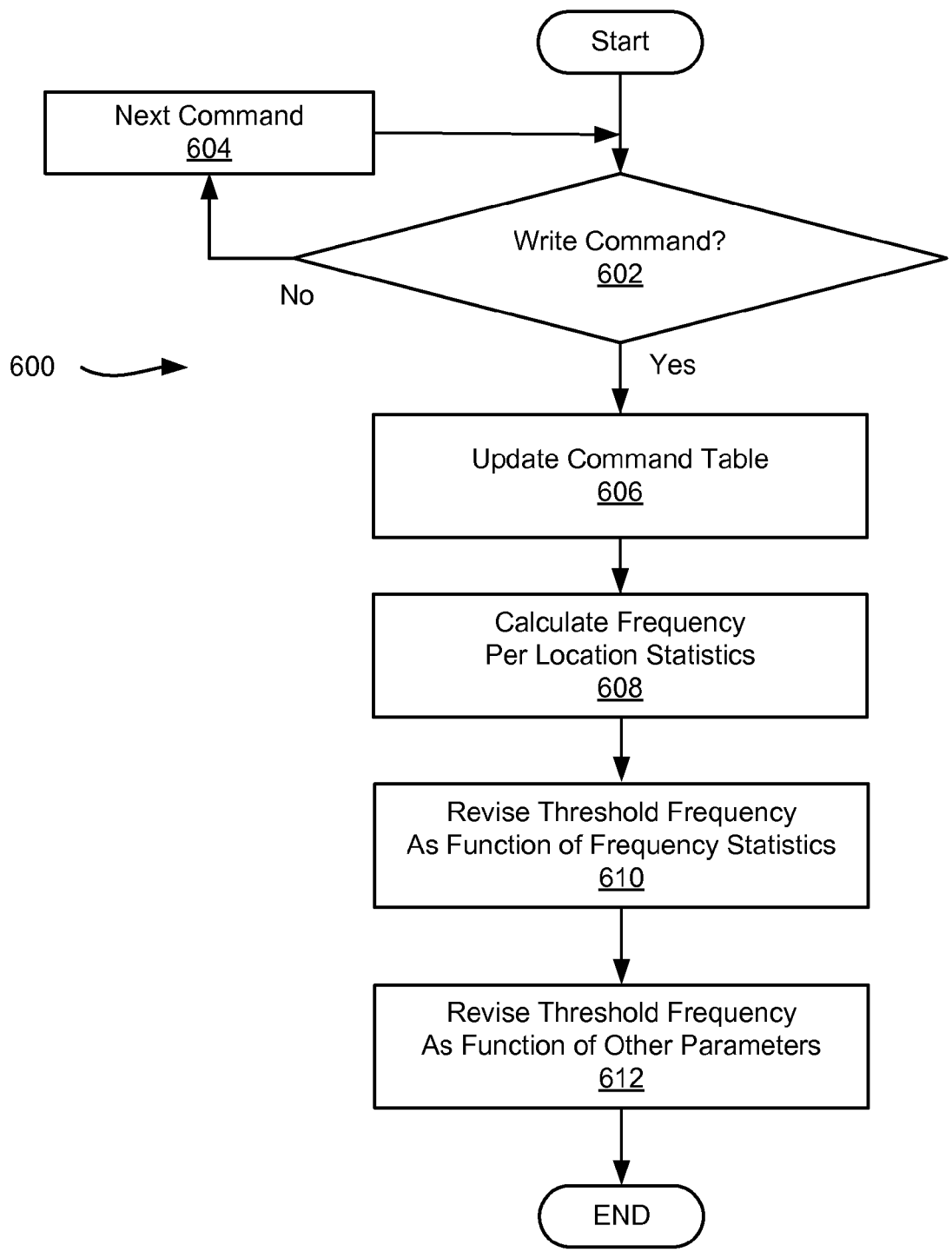
FIG. 6 illustrates example operations for determining the threshold frequency for identifying cacheable data.
Figure 7:
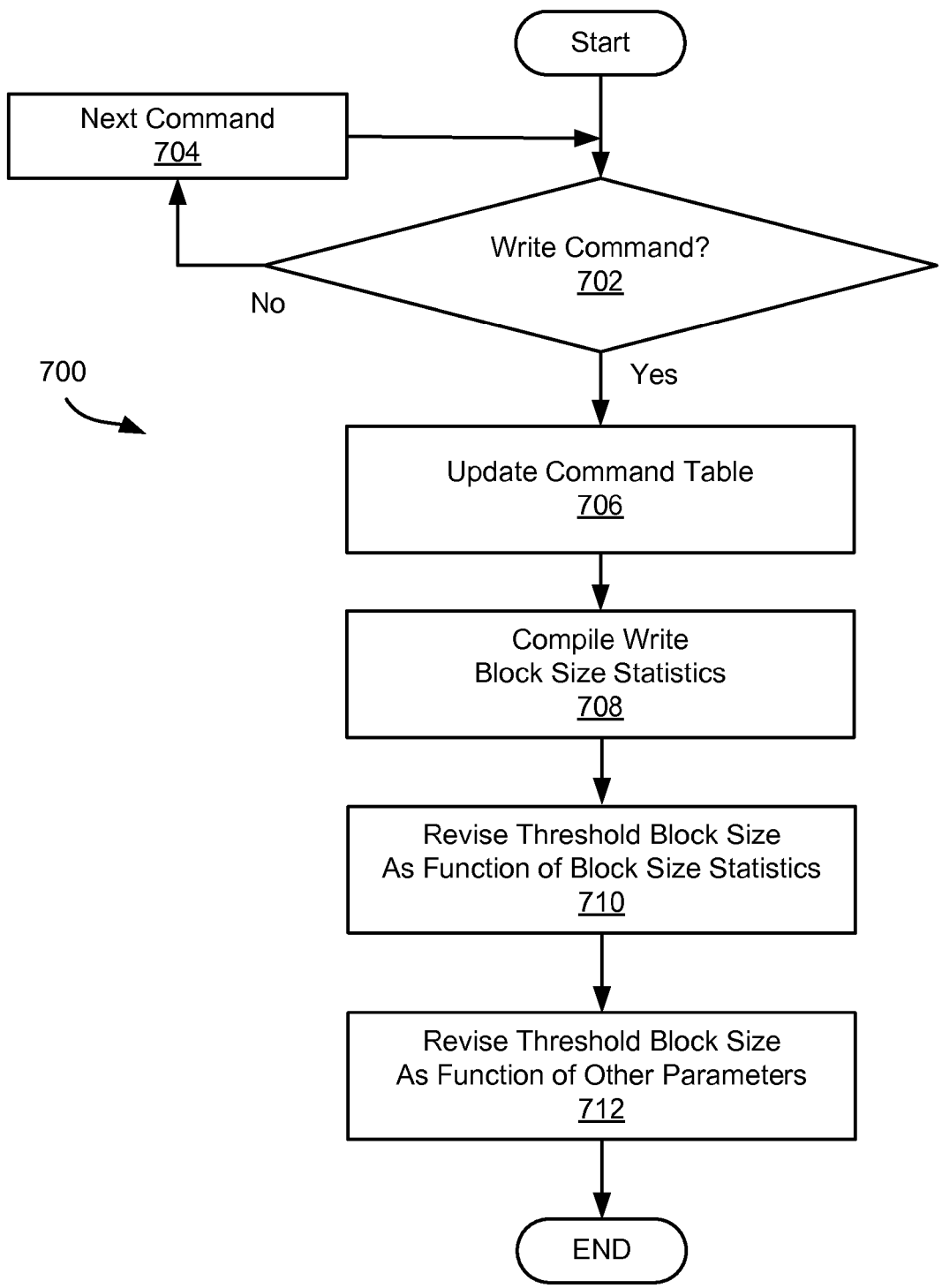
FIG. 7 illustrates example operations for determining the threshold block size for identifying cacheable data.

As discussed above, the programs 400 and 500 use various threshold values for the frequency of past write operations to certain storage locations on the storage media 116 and the block-size of the data to be written to these storage locations. FIGS. 6 and 7 disclosed below illustrate example implementations of methods used to determine these threshold values.

FIG. 6 illustrates example operations for determining the threshold frequency for identifying cacheable data. The functioning of the operations 602 to 606 is generally similar to the functioning of the operations 502 to 506 discussed above with respect to FIG. 5. Once the operation 606 has updated the command table, control passes to operation 608, which calculates/updates the frequency statistics used by various determination operations in FIGS. 3-5. Operation 608 continuously calculates and updates various frequency statistics such as, the frequency of access to various storage locations, the average frequency of access per storage device, various percentile values of the frequency of access per storage device, etc. In one implementation, various statistics calculated by the operation 608 is stored in a volatile memory on the interface controller 110 when the power is on. At predetermined intervals, such statistics is transferred to non-volatile or permanent memory on periodic basis.

Subsequently, an operation 610 revises the threshold frequency used by various determination operations in FIGS. 3-5 based on the frequency statistics compiled by operation 608. In one implementation, the threshold frequency is set at a particular percentile value, such as ninety-percentile level of the various frequencies of access per storage device. In such a case, anytime the frequency of access to a particular storage location is higher than such ninety-percentile value, commands sent to that particular storage location is determined to be potentially containing cacheable data.

Subsequently, an operation 612 revises threshold frequency as a function of other parameters. In one implementation, the threshold-frequency is a function of the type of the storage device 106. For example, if the storage device 106 is used as a storage device on a video game, the threshold frequency determined by the operation 610 may be adjusted by a first pre-determined factor. On the other hand, if the storage device 106 is used on a car, the threshold frequency determined by the operation 610 may be adjusted by a second pre-determined factor, wherein the first and the second pre-determined factors being different from each other. In one implementation, the interface controller 110 is provided with a look-up table that provides various factor values as function of type of the storage device 106 and a user is able to select such factor value during setting up the storage device 106.

FIG. 7 illustrates example operations for determining the threshold block size for identifying cacheable data. The functioning of the operations 702 to 706 is generally similar to the functioning of the operations 502 to 506 discussed above with respect to FIG. 5. Once the operation 706 has updated the command table, control passes to operation 708, which calculates/updates the write block-size statistics used by various determination operations in FIGS. 3-5. Operation 708 continuously calculates and updates various block-size statistics such as, the average block-size for write commands to the storage device, various percentile values of the block-size for write commands, etc. In one implementation, various block-size statistics calculated by the operation 708 is stored in a volatile memory on the interface controller 110 when the power is on and such statistics is transferred to non-volatile or permanent memory on periodic basis.

Subsequently, an operation 710 revises the threshold block-size used by various determination operations in FIGS. 3-5 based on the block-size statistics compiled by operation 708. In one implementation, the threshold block-size is set at a particular percentile value, such as, at ten-percentile level of the various block-sizes of previous write-accesses to the storage device. In such a case, anytime the block-size for a particular write-access to a particular storage location is lower than such ten-percentile value, such commands are determined to be potentially containing cacheable data.

Subsequently, an operation 712 revises threshold block-size as a function of other parameters in a manner the operation 612 revises threshold frequency as a function of other parameters. In yet alternate implementation, the threshold frequency determined in operation 610 and the threshold block-size determined in operation 710 is interdependent. In such an implementation, a number of combination values of the threshold frequency and threshold block-size may be used to determine if a write command potentially contains cacheable data.

The implementations of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the implementations of the invention described herein are referred to variously as operations, steps, objects, or modules. Furthermore, it should be understood that logical operations may be performed in any order, unless explicitly claimed otherwise or a specific order is inherently necessitated by the claim language. Furthermore, one of more portions of the various processes disclosed above with respect to FIGS. 3-7 may be implemented by software, hardware, firmware or combination thereof.

The above specification, examples, and data provide a complete description of the structure and use of example implementations of the invention. Since many implementations of the invention can be made without departing from the spirit and scope of the invention, the invention resides in the claims hereinafter appended. Furthermore, structural features of the different implementations may be combined in yet another implementation without departing from the recited claims. The implementations described above and other implementations are within the scope of the following claims.

What is claimed is:

1. A non-transitory computer-readable storage medium encoding a computer program for executing a computer process on a computer system, the computer process comprising:
   if a received data packet contains cacheable data:
   separating the cacheable data from remainder of the received data packet, wherein the received data packet is determined to contain cacheable data if the received data packet contains data written to a storage location that is written at above a threshold frequency;
   storing cacheable data to a second storage device; and
   storing at least a portion of the data from remainder of the received data packet to a first storage device.

2. The computer-readable storage medium of claim 1, wherein the cacheable data is logging data.

3. The computer readable storage medium of claim 1, wherein the received data packet is determined to contain cacheable data if a block-size of the data written to the storage location is below a threshold block-size.

4. The computer readable medium of claim 1, wherein the first storage device is a hard drive disk (HDD) and the first storage location is a logical block address (LBA) on the HDD.

5. The computer readable medium of claim 1, wherein the second storage device is a volatile memory located on an HDD assembly.

6. The computer readable medium of claim 1, wherein the computer process further comprises transferring the cacheable data from the second storage device to the first storage device in case of a power interrupt.

7. The computer readable medium of claim 1, wherein the computer process further comprises transferring the cacheable data from the second storage device to the first storage device at a predetermined time interval.

8. The computer readable medium of claim 1, wherein the values of the threshold frequency and the threshold block-size are interdependent.

9. A method comprising:
   comparing a storage location related to a new write command on a storage device with storage locations of a predetermined number of write commands stored in a first table to determine frequency of write commands to the storage location; and
   if the frequency is determined to be higher than a first threshold and if a block-size of the data related to the write command is above a threshold block-size, storing the data related to the write command in a write cache.

10. The method of claim 9, further comprising:
    if the frequency is determined to be lower than the first threshold, storing the data related to the write command at the storage location.

11. The method of claim 9, further comprising:
    if the frequency is determined to be higher than the first threshold, storing the data related to the write command in a cache memory.

12. The method of claim 9, wherein the threshold frequency is based on a first percentile of frequency of writing data to a given location on the storage device.

13. The method of claim 9, further comprising transferring the data from the write cache to the storage device in case of a power interrupt.

14. A storage device communicatively connected to a computer, the storage device comprising:
    a write-cache;
    a storage media; and
    an interface controller configured to determine whether data attached to a write command is logging data by comparing the frequency of write commands to a location where the data attached to a write command is to be written with a threshold frequency and by comparing a block size of the data attached to a write command with a threshold block size.

15. The storage device of claim 14, wherein the interface controller is further configured to separate the logging data from remainder of data attached to the write command.

16. The storage device of claim 14, wherein the interface controller is further configured to write the data attached to a write command to the write-cache if the interface controller determines that the data attached to a write command is logging data.

17. The storage device of claim 14, wherein the interface controller is further configured to write the data attached to the write command to the storage media if the interface controller determines that the data attached to a write command is not logging data.

18. The non-transitory computer-readable storage medium of claim 1, wherein the storing of the portion of the data to the first storage device further comprises:
  storing the portion of the data to the first storage device if the frequency is determined to be lower than the threshold frequency.

19. The non-transitory computer-readable storage medium of claim 1, wherein the storing of the portion of the data to the first storage device further comprises:
  storing the portion of the data to the first storage device if a block-size of the data written to the storage location is determined to be greater than the threshold block-size.

\* \* \* \* \*